O. SCHNITZLER.
SPEED CHANGING MECHANISM.
APPLICATION FILED AUG. 12, 1912.
1,092,297.
Patented Apr. 7, 1914.
4 SHEETS—SHEET 1.
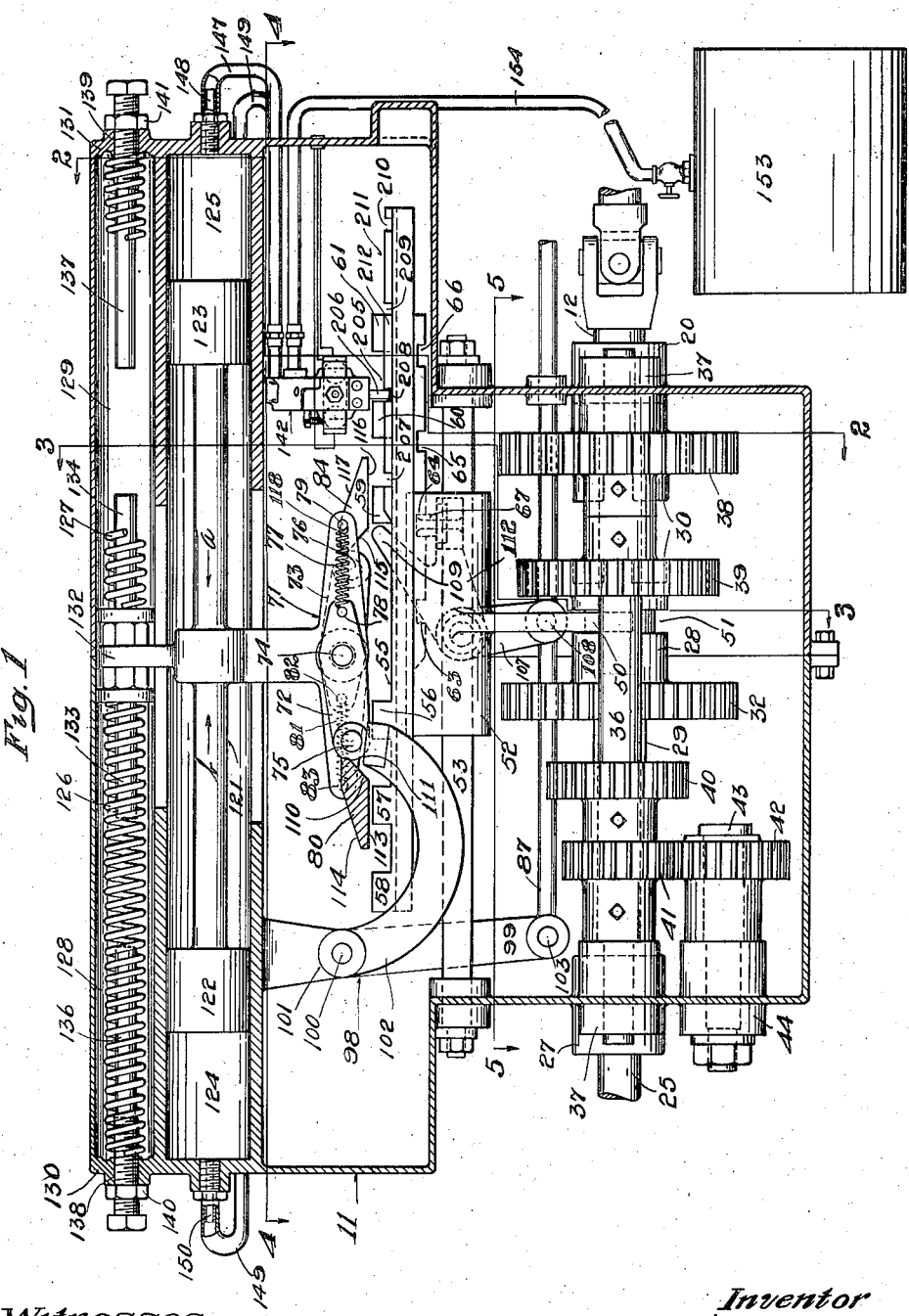
Witnesses
Theresa Silber
R. B. Gerfey
Inventor
Oscar Schnitzler,
by W. F. Herbslet,
his Attorney.

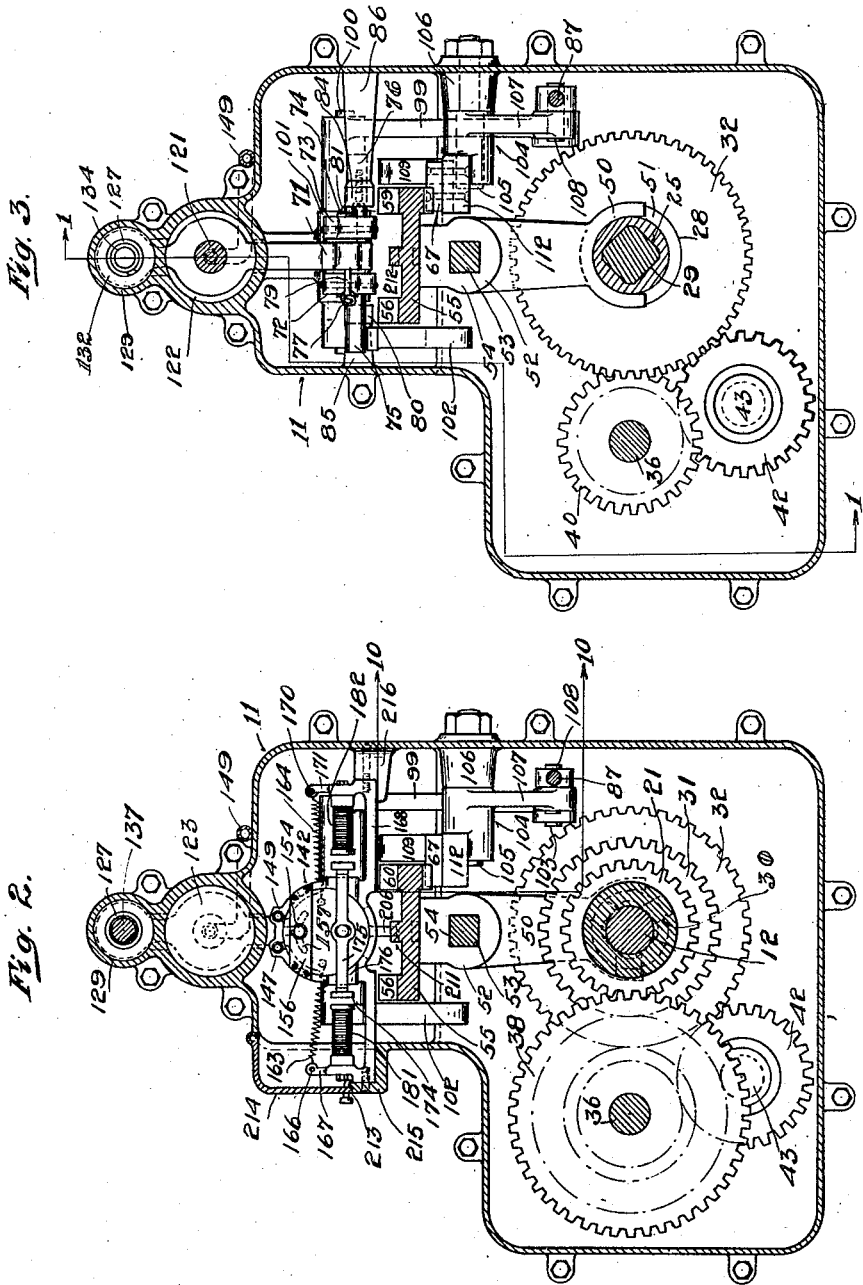

O. SCHNITZLER.
SPEED CHANGING MECHANISM.
APPLICATION FILED AUG. 12, 1912.
1,092,297.
Patented Apr. 7, 1914.
4 SHEETS—SHEET 3.
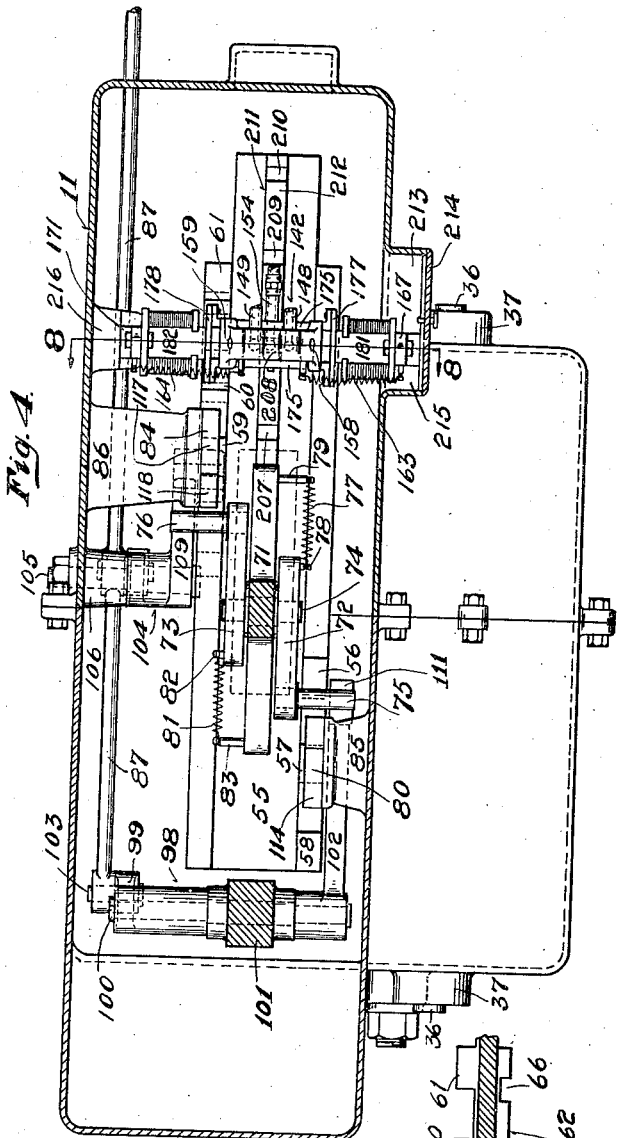
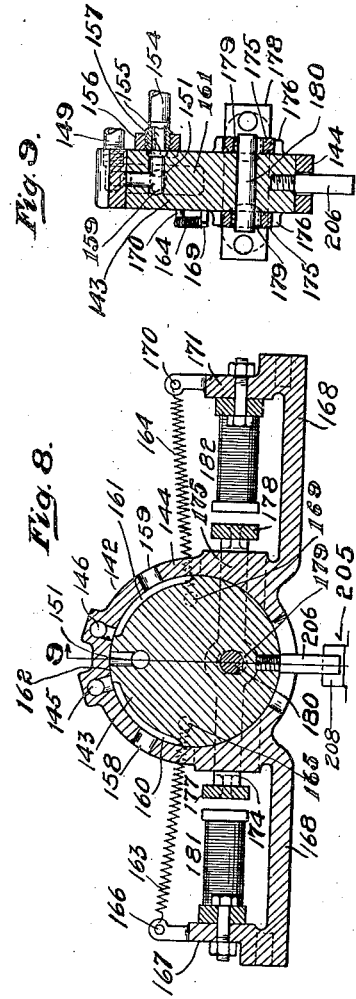
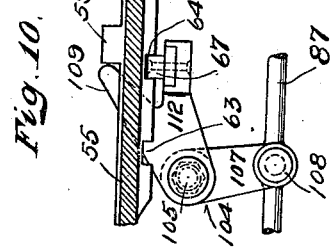
Witnesses
Theresa Silber
R. B. Gerfen
Inventor
Oscar Schnitzler
by N. J. Herbileb
His Attorney O. SCHNITZLER.
SPEED CHANGING MECHANISM.
APPLICATION FILED AUG. 12, 1912.
1,092,297.
Patented Apr. 7, 1914.
4 SHEETS—SHEET 4.
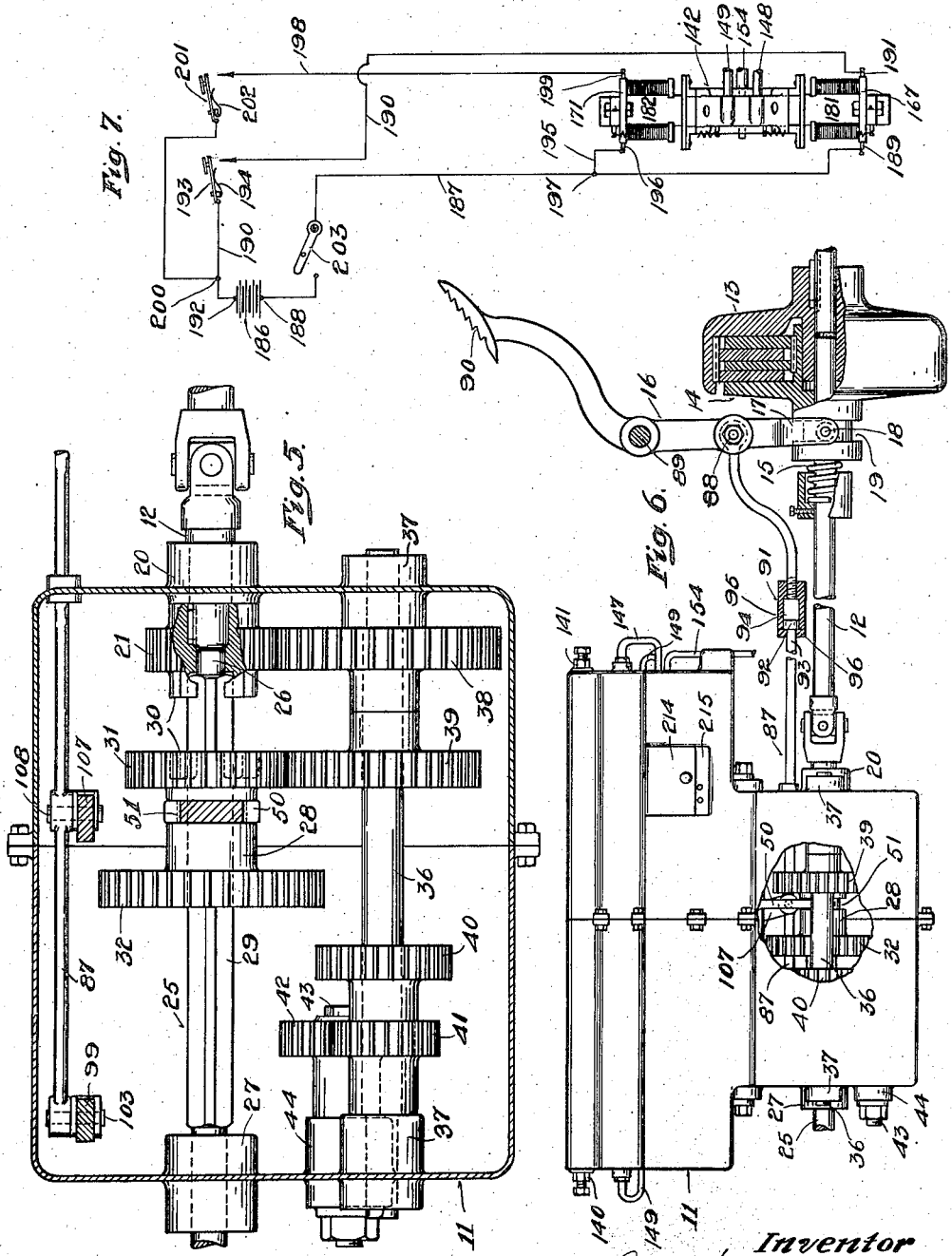

UNITED STATES PATENT OFFICE.

OSCAR SCHNITZLER, OF REMINGTON, OHIO.

SPEED-CHANGING MECHANISM.

1,092,297. Specification of Letters Patent. Patented Apr. 7, 1914.

Application filed August 12, 1912. Serial No. 714,624.

*To all whom it may concern:*

Be it known that I, OSCAR SCHNITZLER, a citizen of the United States, residing at Remington, in the county of Hamilton and State of Ohio, have invented certain new and useful Improvements in Speed-Changing Mechanism, of which the following is a specification.

It is the object of my invention to provide novel means in speed changing mechanism whereby a change in relation in the power transmitting elements is readily effected.

My invention is employable in various relations, but I prefer to show the same in connection with a power transmitting device suitable for use on a traveling vehicle, as an automobile.

It is a further object of my invention to provide fluid actuating means for the movable member of the speed-change parts; further to provide novel relation of elements whereby, upon initiation of movement in the actuating means, the operative connection in the main drive clutch is relieved prior to the engagement of the movable member of the speed-change parts in new relation; further to provide novel means whereby the changes in relation in the speed-change parts take place in sequences of increasing or decreasing speed relations; further to provide novel locking mechanism for maintaining the parts in acquired positions; and, further to provide novel means for controlling the duration of actuation of the actuating means from a member concerned in causing change in driving relation in the speed-change parts.

The invention will be further readily understood from the following description and claims, and from the drawings, in which latter:

Figure 1 is a view showing the operative parts of my improved device in side elevation and the casing in section on the irregular line 1—1 of Fig. 3, for exposure of the interior of the casing. Fig. 2 is a cross-section of my improved device on the irregular line 2—2 of Fig. 1. Fig. 3 is a cross-section of my improved device on the irregular line 3—3 of Fig. 1. Fig. 4 is a plan section of my improved device on the line 4—4 of Fig. 1. Fig. 5 is a plan section of my improved device on the line 5—5 of Fig. 1, partly broken away. Fig. 6 is a side elevation, partly broken away, and partly in section, showing my improved device in connection with the main drive-clutch and operating means for the latter. Fig. 7 is a plan view of the fluid valve and the electric translating devices therefor, and showing the electric connections for the latter in diagrammatic form. Fig. 8 is a cross-section of the fluid valve and operating means for the same, taken on the line 8—8 of Fig. 4. Fig. 9 is a cross-section of the latter on the line 9 of Fig. 8; and, Fig. 10 is a side elevation, partly in section on the line 10—10 of Fig. 2, showing the locking means for the shifting mechanism.

11 represents the casing of my improved device and is arranged to be suitably mounted, for instance on a propelled vehicle such as an automobile.

12 is the drive-shaft operated in suitable manner, as from the fly-wheel 13 of an internal combustion motor having driving connection with the drive-shaft by means of the usual main drive clutch 14, normally held in operative relation by a spring 15, and arranged to be released by a clutch-lever 16 having a fork 17 provided with pins 18 received in an annular groove 19 in one of the clutch-members, for releasing the clutch. The drive-shaft is mounted in a bearing 20 in the casing. It has a suitable driving gear 21 secured thereto.

25 is a driven-shaft, the journal stud 26 of which has bearing in the driving gear. The driven shaft is also shown journaled in a bearing 27 of the casing. If used in connection with an automobile, the driven shaft has suitable connection with the driven axle of the same.

28 is a sleeve slidable lengthwise on the driven shaft, the portion 29 of the driven shaft on which this sleeve slides being shown polygonal in cross-section, the bore of the sleeve being of mating cross-section. There is a clutch 30 between the gear 21 and the sleeve for directly connecting the drive-shaft with the driven shaft, in the present instance imparting high speed. Gears 31, 32, are on the sleeve 28.

36 is an intermediate shaft journaled in bearings 37 of the casing and having gears 38, 39, 40 and 41 fixed thereon.

42 is a reversing gear journaled on a stud 43 mounted in a bearing 44 of the casing, the gear 42 being in continuous mesh with the gear 41.

The sleeve 28 is movable lengthwise on the shaft 25 for causing engagement of the clutch faces of clutch 30, whereby high speed is transmitted from the drive-shaft to the driven shaft; for causing meshing between the gear 31 and the gear 39 whereby an intermediate speed is transmitted from the drive-shaft to the driven-shaft through the gears 21, 38, 39 and 31; for causing meshing between the gear 32 and the gear 40, whereby low speed is transmitted from the drive-shaft to the driven shaft through the gears 21, 38, 40 and 32; or for causing meshing between the gear 32 and the reversing gear 42, whereby reverse movement at low speed is imparted to the driven shaft from the drive-shaft through the gears 21, 38, 41, 42 and 32.

I will now describe the novel mechanism I employ for causing movement of said gear-sleeve, this gear-sleeve being instanced as a movable member of the train of gears for effecting change of relation in the power transmitting elements.

50 is a fork received in an annular groove 51 in the sleeve 28. The fork is mounted on a slide 52 slidable lengthwise on a rod 53, the said rod being polygonal in cross-section and the slide-connection of the slide therewith being shown as a bearing 54 of corresponding cross-section.

55 is a positioning bar secured to the slide. The positioning bar may be made in one or more parts and has the purpose of positioning the fork so as to cause proper meshing of the gears of the power transmitting elements. I have further provided novel means for moving said slide and locking the same in actuated positions, these means causing movement of the slide in steps in increasing or decreasing speed relations or for reversing the power transmission.

I have exemplified my invention as applied in a four-step speed device, three of these steps being for varying speeds and the fourth for reversal of movement. It is obvious of course that the relations of these steps may be changed or their number increased or diminished without departing from the spirit of my invention.

The positioning bar is provided with abutments 56, 57, 58, effective in one direction of movement of the positioning bar, and with abutments 59, 60 and 61, effective in the opposite direction of movement of the positioning bar. It is also provided with a lock 62 which comprises notches 63, 64, 65, 66, into any one of which a keeper 67 is arranged to be received, the lock being arranged to be released just prior to actuation of the positioning bar and to be maintained in inactive relation until the positioning bar completes its step of movement. For effecting this movement, I provide a traveling block 71 on which arms 72, 73, are pivoted about a stud 74, the arm 72 being provided with a pin 75 and the arm 73 being provided with a pin 76, a spring 77 between a tail 78 of the arm 72 and a pin 79 on the block 71 maintaining the pin 75 in operative relation with a cam-block 80, and a spring 81 between a tail 82 on the arm 73 and a pin 83 on the traveling block 71 maintaining the pin 76 in proper relation with a cam-block 84. The cam-block 80 is secured to the casing on a bracket 85 and the cam-block 84 is secured to the casing on a bracket 86.

87 is a pull-rod articulated at 88 to the main clutch-lever 16. The lever 16 is pivoted to a suitable stationary part of the automobile, as on a rod 89, and is provided with a usual treadle 90. The pull-rod is preferably provided with a lost-motion device operative in one direction, shown as a joint 91 comprising a knob 92 on the section 93 of the pull-rod, arranged to have longitudinal movement in a pocket 94 in the section 95 of the pull-rod, the knob being normally seated against the outer end-wall 96 of the pocket, so that, when the section 93 of the pull-rod is pulled, the lever 16 will be actuated for releasing the main drive-clutch, whereas, if the treadle 90 is operated, the section 95 of the pull-rod will move longitudinally on the section 93 without moving the latter, the section 95 and the treadle being at opposite sides of the pivot 89 of said lever 16.

98 is a bell-crank lever comprising an arm 99 rigidly secured to a rocker-pin 100 journaled in a bearing 101 and having the other arm 102 of said bell-crank lever secured thereto. The arm 99 has articulation at 103 with the pull-rod 87.

104 is a bell-crank lever pivoted on a stud 105 secured in a bearing 106 of the casing. This bell-crank lever comprises an arm 107 having articulation at 108 with the pull-rod 87 and also comprises an operated arm 109.

The normal idle relations of the actuating parts are shown in the drawings, the driving relation of the power transmitting elements being shown as a relation for transmitting intermediate speed. Assuming now that a change of speed from intermediate to low is to be effected, the traveling block 71 will be caused to move in the direction of the arrow $a$. Upon initiation of this movement, the pin 75 will be guided by the cam-face 110 on the cam-block 80 and strike the striker-face 111 of the arm 102, thereby swinging the bell-crank lever 98, and pulling on the pull-rod 87 and releasing the main drive-clutch, the gearing parts however continuing their movements due to inertia. The bell-crank lever 104 will also have been moved by the movement of the pull-rod and thereby release the keeper 67 from the notch 64 in which it has been positioned, this keeper being mounted on an arm 112 on the bell-crank lever 104. The pin 75 will next engage the abutment 57, and the traveling block, continuing its movement, will carry with it the positioning bar, which has now been released, and thereby cause longitudinal shifting of the sleeve 28 and cause disengagement of the gear 31 thereon from the gear 39 and engagement between the gear 32 on said sleeve and the gear 40, and thereby place said power transmitting elements in relation for transmitting low speed. Until this new engagement of the latter parts has been effected, the pin 75 travels along the lower face 113 of the cam-block 80, and when this new relation of gearing in the power transmitting elements has been effected, the pin 75 would have reached the end of said lower face of the cam-block 80 and be urged upwardly by the spring 77 for bringing said pin into coöperative relation with the cam-face 114 on said cam-block 80, so that retraction of the traveling block 71 to initial position may be effected without reëngagement of said pin with any of the operating parts, the pin in this retraction climbing upon the cam-face 114 and along the upper edge of the cam-block 80, and returning to initial position above the striker face 111, which has been meanwhile returned to initial position, for, when the fork 50 has completed its movement for the step in transmission relation just effected, the keeper 67 will enter the next notch 65 of the traveling block for locking the traveling block and slide in said step of power transmitting relation. If on the other hand it is desired to effect a change of relation in the power transmitting elements from intermediate to high speed, the block 71 is caused to move in the direction of the arrow $b$. Upon initiation of this movement the pin 76 will engage the inclined cam-face 115 on the cam-block 84 and engage the end of the arm 109 for rocking the bell-crank lever 104, whereby the pull-rod is moved for disengaging the main drive-clutch and the keeper released from its notch in the lock 62.

It will be noted that in the construction described, both of the bell-crank levers 98 and 104 move upon actuation of either of said bell-crank levers, one of said bell-crank levers acting idly.

The pin 76 will next engage the abutment 59 for moving the traveling block 71 and the slide 52 in the direction of the arrow $b$, whereby engagement is caused between the faces of the transmitting clutch 30, the pin being held in engagement with said abutment by the lower face 116 of the cam-block 84. When proper engagement has been caused between the members of the power transmitting elements in their new relation, the pin 76 will have reached the end of said lower face and be caused to move upwardly by the spring 81, the traveling block being then retracted to initial position and the pin 76 traveling along the inclined cam-face 117 and the upper edge 118 of the cam-block 84 to initial position.

For effecting movement of the traveling block 71, I connect the same with a piston-rod 121, in the present exemplification shown as carrying pistons 122, 123, in cylinders 124, 125. For maintaining said pistons in normally inactive relation, I provide springs 126, 127, acting in opposite directions upon the piston-rod, as by being received in bores 128, 129, acting in reverse directions against the opposite ends 130, 131, of said bores and on a lug 132 on said piston-rod between said springs.

For adjusting the end thrust of the pistons, I provide oppositely extending stop-rods 133, 134, which extend from said lug 132 and are arranged to respectively engage oppositely extending contact rods 136, 137, respectively threaded in bearings 138, 139, in the casing, in which latter the contact-rods are longitudinally adjusted, being arranged to be locked into adjusted positions by jam-nuts 140, 141. The limits of movements of the pistons and of the traveling block are thereby regulated.

I shall now describe the means for actuating the pistons.

142 is a valve, the plug 143 of which is rockable in a valve-casing 144, the valve-casing having outlet-ports 145, 146, therein. The port 145 is connected by a passage 147 with a port 148 in the cylinder 125. The port 146 is connected by a passage 149 with a port 150 in the cylinder 124.

151 is an inlet-port which communicates with either port 145, 146. There is a suitable pressure supply for fluid under pressure, which fluid may be air, and the supply obtained from a pressure-tank 153, a fluid passage 154 being between the pressure tank and the inlet-port 151. The passage 154 connects with a port 155 in a cross-piece 156 of the valve-casing, this port communicating with an arc-slot 157 in the valve-plug, (see Figs. 2 and 9), the arc-slot communicating with the inlet-port 151.

158, 159, are outlet-ports in the valve-casing, and 160, 161, are outlet-passages in the plug of the valve.

When the valve-plug 143 is rocked to cause registry of the port 151 with the port 145, a movement of the pistons 122, 123, will be caused in the direction of the arrow $a$, the rocking of the valve-plug causing registry of the passage 161 with the ports 146 and 159 for permitting exhaust of the cylinder 124. Both cylinders are normally open to the air.

If the valve-plug is rocked for causing registry of its inlet port 151 with the port 146, a movement of the pistons will be caused in the direction of the arrow $b$, and registry of the outlet passage 160 with the ports 145 and 158 will also be caused for permitting exhaust of the cylinder 125.

The normal positioning of the inlet-port 151 against the blank wall 162 of the valve-casing is caused by springs 163, 164. The spring 163 is located between a pin 165 on the valve-plug and a pin 166 on a bracket 167 of a support 168, of which the valve-casing may be a part. The spring 164 is located between a pin 169 on the valve-plug and a pin 170 on a bracket 171 of said support.

For causing rocking of the valve-plug, I provide an armature-slide 174 comprising side-pieces 175 sliding in bearings 176 in the valve-casing and connected by armature plates 177, 178. Each of the side-pieces has a slot-bearing 179 in which a pin 180 on the valve-plug is received, this pin being eccentrically placed on the valve-plug, so that, upon longitudinal movement of the armature-slide, the valve-plug will be rocked in its casing for causing registry of the various ports. The side-pieces also hold the valve-plug in longitudinal position in its casing.

181, 182 are electro-magnets of suitable form mounted respectively on the brackets 167, 171. Suitable electrical connections are provided for the magnets for energizing the same for causing selective energizing of the magnets 181 or the magnets 182 for rocking the valve-plug in either direction, and thereby initiating movement in either direction of the actuating mechanism for actuating the movable member of the power transmitting elements for effecting change of speed relation therein. This electric device may be automatic, in which case it is preferably actuated by the driven element, as through the medium of a suitable governor controlled by the speed of said driven element, which latter may be the driven axle of an automobile. I have however preferred to show a manual means for completing the circuits which energize the magnets and thereby initiating the movement in said actuating mechanism for causing change of speed relation in the power transmitting elements.

186 represents the battery. An electric conductor 187 connects one of the poles 188 of the battery with one of the poles 189 of the electro-magnets 181. An electric conductor 190 connects the other pole 191 of the electro-magnet 181 with the other pole 192 of the battery. An electric switch 193 is interposed in the conductor 190, this switch being normally in open relation, induced by a spring 194.

195 is an electric conductor which connects the pole 188 of the battery with one of the poles 196 of the electro-magnets 182, preferably by being connected to the electric conductor 187 at 197.

198 is an electric conductor which connects the other pole 199 of the electro-magnets 182 with the other pole of the battery, preferably by connecting with the electric conductor 190 at 200. An electric switch 201 is interposed in the electric conductor 198 and is normally in open relation, induced by a spring 202.

An electric switch 203 is interposed in the electric circuit between the battery and the electro-magnets, and is arranged to be opened or closed, as may be desired. If this switch is open, it places the electro-magnets out of commission and maintains the movable member of the power transmitting elements in its located relation, so that the speed relation in the power transmitting mechanism may be constant.

When the electric switch 203 is in connected relation, a connection of short duration in either the electric switch 193 or the electric switch 201 will cause energizing of the respective electro-magnets 181, 182, for causing a rocking of the valve-plug and bringing its inlet-port into registry with either of the ports 145, or 146, for actuating the pistons, whereupon movement of the traveling block 71 will be initiated for initiating longitudinal movement in the positioning bar 55.

In order to maintain the valve in open relation until the step of movement of the slide 52 is completed, I provide a lock 205 for said valve. This lock comprises a lug 206 on the valve-plug, which forms a keeper which coöperates with notches 207, 208, 209 and 210 in a bar 211, the bar having lugs 212 between said notches against which the keeper slides for maintaining the ports of the valve in open relation until the movement of the slide 52 and the change in speed relation of the power transmitting element has been effected, upon which the keeper is permitted to enter the next notch on the bar 211. The bar 211 preferably has a movement coincident with the movement of the positioning bar 55 and may be a part of the same as shown.

The valve and magnet parts may be assembled on the support 168, which latter is arranged to be received into the casing through an opening 213 and rest on seats 215, 216, in the casing and be secured in place by suitable bolts. The parts and connections therefor may receive attention through said opening, which is arranged to be closed by a door 214.

Having thus fully described my invention, what I claim as new and desire to secure by Letters Patent, is:

1. In speed changing mechanism, the combination of speed-change parts comprising a movable power-transmitting member movable into a plurality of positions effecting a plurality of changes of speed, and a fluid-actuated device arranged for operative connection with said movable member for moving the same into said plurality of positions for effecting said speed-changes.

2. In speed changing mechanism, the combination of speed-change parts comprising a movable member for effecting the changes of speed, a fluid-actuated device arranged for operative connection with said movable member for moving the same for effecting said speed-changes, and means embracing an electric translating device for initiating movement in said fluid-actuated device.

3. In speed changing mechanism, the combination of a driving member, a drive-clutch therefor, a driven member, speed-change parts between said members comprising a movable member, a fluid-actuated element arranged for operative connection with said drive-clutch for relieving the same and for operative connection with said movable member for moving the same.

4. In speed changing mechanism, the combination of a driving member comprising a drive-clutch, a driven member, speed-change parts between said members comprising a movable member, shifting means for relieving said drive-clutch, shifting means for moving said movable member, and a traveling member having spaced operative connections with said respective shifting means, the spacing in said operative connection for said first-named shifting means being shorter than for said last-named shifting means.

5. In speed changing mechanism, the combination of speed-change parts comprising a movable member, a shifting member for the latter for moving the same in opposite directions for increasing or decreasing speeds, and a fluid-actuated means arranged for operative connection with said shifting member in both directions of its movement for moving the same for effecting said changes of speed.

6. In speed changing mechanism, the combination of speed-change parts comprising a movable member movable in opposite directions, a shifter having operative connection therewith, and an actuating device for said shifter normally out of range therewith, and cam-mechanism for the latter for deflecting the same into range of said shifter.

7. In speed changing mechanism, the combination of speed-change parts comprising a movable member movable in opposite directions, a drive-clutch having operative connection with said speed-change parts, a moving part having operative connection with said drive-clutch for relieving the same, a shifter having operative connection with said movable member, an actuating device for said moving part and for said shifter normally out of range of said moving part and shifter, and cam-mechanism for said actuating device for moving the same into range of said moving part and said shifter in the order named.

8. In speed changing mechanism, the combination of a driving member comprising a drive-clutch, a driven member, speed-change parts between said members comprising a movable member, a shifter for the latter, a lock for said shifter, actuating means for said shifter comprising a lost-motion device for said shifter, and a part actuated by said actuating means arranged for connection with said lock and drive-clutch.

9. In speed changing mechanism, the combination of speed-change parts comprising a movable member, a shifter therefor, an actuating device for said shifter normally located in an initial position, means for moving said actuating device in opposite directions, said actuating device comprising co-acting parts for said shifter normally in inactive relation, and cam-mechanism for moving said coacting parts into active relation.

10. In speed changing mechanism, the combination of speed-change parts comprising a movable member for effecting the changes of speed, a traveling part arranged for moving said movable member, and compressed fluid piston mechanism having operative connection with said traveling part for actuating said traveling part.

11. In speed changing mechanism, the combination of speed-change parts comprising a movable member for effecting the changes of speed, a traveling part for actuating said movable member, compressed fluid piston mechanism having operative connection with said traveling part for moving said traveling part, said last-named mechanism comprising a valve, and automatic controlling means for said valve having operative connection with a movable part concerned in speed-change.

12. In speed changing mechanism, the combination of a driving member, a drive-clutch therefor, a driven member, speed-change parts between said members comprising a movable element, a movable element having connection with said drive-clutch for relieving the same, a traveling part for actuating said movable elements, and compressed fluid actuating means for actuating said traveling part.

13. In speed changing mechanism, the combination of a driving member, a drive-clutch therefor, a movable element for actuating said drive-clutch, a driven member, speed-change parts between said driving and driven members comprising a movable element, a traveling member for actuating said movable elements in the order named, and compressed fluid piston mechanism for moving said traveling member.

14. In speed changing mechanism, the combination of a driving member, a drive-clutch therefor, a movable element for actuating said drive-clutch, a driven member, speed-change parts between said driving and driven members comprising a movable element, a traveling member for actuating said movable elements, piston mechanism for moving said traveling member comprising a fluid-valve, and an electric translating device for actuating said valve.

15. In speed changing mechanism, the combination of speed-change parts comprising a movable member, a shifter for said movable member, said shifter comprising abutments, an actuating device for said abutments normally out of range therewith, and a cam for directing said actuating device into range of said abutments, and means for moving said actuating device.

16. In speed changing mechanism, the combination of a driving member, a drive-clutch therefor, an abutment having connection with said drive-clutch for relieving the same, a driven member, speed-change parts between said driving member and driven member comprising a movable member, a shifter for said movable member comprising an abutment, an actuated member having a part thereon coacting with said abutments, and a cam for directing said coacting part into range of said first-named abutment and said second-named abutment in the order named.

17. In speed changing mechanism, the combination of a driving member, a drive-clutch therefor, an abutment having connection with said drive-clutch for relieving the same, a driven member, speed-change parts between said driving member and driven member comprising a movable member, a shifter for said movable member comprising an abutment, an actuated member having a part thereon coacting with said abutments, and a cam for directing said coacting part into range of said first-named abutment and said second-named abutment in the order named, and a lock for said shifter acted on by said first-named abutment for releasing said lock.

18. In speed changing mechanism, the combination of speed-change parts comprising a movable member, a shifter for said movable member, fluid-actuated means for moving said shifter, said fluid-actuated means comprising a valve embracing a movable member movable for opening said valve, and means movable with said shifter for maintaining said valve in open relation between limits of movements of said shifter.

19. In speed changing mechanism, the combination of speed-change parts comprising a movable member, a shifter for said movable member, fluid-actuated means for moving said shifter, said fluid actuated means comprising a valve embracing a movable element, an electric translating device for moving said movable element, and arresting means for said movable element for maintaining said valve in open relation between limits of movements of said shifter.

20. In speed changing mechanism, the combination of speed-change parts comprising a movable member, a shifter for said movable member, a fluid-actuated means for moving said shifter, said fluid-actuated means comprising a valve embracing a movable element, an electric translating device for moving said movable element, arresting means for said movable element for maintaining said valve in open relation between limits of movements of said shifter, and a lock for said shifter controlled by said fluid-actuated means.

21. In speed-changing mechanism, the combination of speed-change parts comprising a movable member, a shifter for said movable member, a drive-clutch, a movable part for relieving the connection in said drive-clutch, fluid-actuated means, said fluid-actuated means comprising a valve embracing a movable element, an electric translating device for moving said movable element, arresting means for said movable element for maintaining said valve in open relation between limits of movements of said shifter, said fluid-actuated means having operative connection with said movable part and said shifter for actuating the same.

22. In speed changing mechanism, the combination of speed-change parts comprising a movable member, a shifter for said movable member, said shifter comprising abutments for increasing speed ratios and abutments for decreasing speed ratios oppositely disposed, a traveling part movable in opposite directions, coacting means on said traveling part for said respective abutments, said coacting means being normally out of range of said abutments, and oppositely disposed cams for directing said respective coacting means into range of said respective abutments.

23. In speed changing mechanism, the combination of a driving member, a drive-clutch therefor, a driven member, speed-change parts between said driving member and driven member comprising a movable member, a shifter for said movable member, abutments for said shifter for ascending speed ratios, oppositely disposed abutments for said shifter for descending speed ratios, abutments for said drive-clutch adjacent to said respective oppositely disposed abutments, a traveling part, oppositely disposed coacting parts thereon for said abutments, and oppositely disposed cams for said coacting parts for directing the same into coaction with said respective abutments for said drive-clutch for relieving said drive-clutch and into range of said respective abutments for said shifter.

24. In speed changing mechanism, the combination of speed-change parts comprising a movable member, a drive-clutch therefor, a shifter for said movable member comprising oppositely disposed series of abutments, actuating means for relieving said drive-clutch comprising abutments adjacent to said last-named series of abutments, a traveling block, oppositely disposed contact-parts thereon, and oppositely disposed cams for directing said respective contact-parts into coaction with said respective abutments for said drive-clutch and said respective series of abutments for said shifter.

25. In speed changing mechanism, the combination of speed-change parts comprising a movable member, a shifter for said movable member movable in opposite directions with step-by-step movements, an actuating part for said shifter movable in opposite directions, means for automatically returning said actuating part to initial positions, and coacting means between said actuating part and said shifter for moving said shifter and operable in both directions of movement of said actuating part.

26. In speed changing mechanism, the combination of speed-change parts comprising a movable member, a shifter for said movable member movable in opposite directions with step-by-step movements, an actuating part for said shifter movable in opposite directions, means for moving said actuating part comprising a valve, means for automatically returning said actuating part to initial positions, coacting means between said actuating part and said shifter for moving said shifter and operable in both directions of movement of said actuating part, and means moving with said shifter maintaining said valve in open relation between limits of the respective steps of movement of said shifter.

27. In speed changing mechanism, the combination of speed-change parts comprising a movable member, means for moving said movable member for effecting speed-change embracing a valve comprising a movable part, and controlling means for said valve operated by a movable element of said mechanism concerned in speed-change.

28. In speed changing mechanism, the combination of speed-change parts comprising a movable member for effecting speed-change, a shifter for said movable member, oppositely disposed series of abutments for said shifter, a traveling block, oppositely disposed arms and contact parts thereon pivoted on said traveling block, said contact parts normally out of range of said abutments, a piston-part actuating said traveling block, resilient means for returning said piston-part to initial positions, and oppositely disposed cams for moving said contact parts into range of said abutments.

29. In speed changing mechanism, the combination of speed-change parts comprising a movable member for effecting speed-change, a shifter for said movable member, oppositely disposed series of abutments for said shifter, a traveling block, oppositely disposed arms and contact parts thereon pivoted on said traveling block, said contact parts normally out of range of said abutments, a piston-part actuating said traveling block, resilient means for returning said piston-part to initial positions, oppositely disposed cams for moving said contact parts into range of said abutments, a main drive-clutch and abutments having operative connection with said main drive-clutch for relieving the same, said last-named abutments normally in positions between said contact parts and the respective abutments of said series of abutments.

30. In speed changing mechanism, the combination of speed-change parts comprising a movable member for effecting speed-change, a shifter for said movable member, oppositely disposed series of abutments for said shifter, a traveling block, oppositely disposed arms and contact parts thereon pivoted on said traveling block, said contact parts normally out of range of said abutments, a piston-part actuating said traveling block, resilient means for returning said piston-part to initial positions, oppositely disposed cams for moving said contact parts into range of said abutments, a lock for said shifter, and abutments having operative connection with said lock for releasing the same, said last-named abutments normally in positions between said contact parts and the respective abutments of said series of abutments.

31. In speed changing mechanism, the combination of speed-change parts comprising a movable member, a drive-clutch, a shifter for said movable member comprising oppositely disposed series of abutments, means for relieving said drive-clutch comprising abutments adjacent to said series of abutments, a traveling block, oppositely disposed contact-parts thereon, and oppositely disposed cams for directing said respective contact-parts into coaction with said respective abutments for said drive-clutch and said respective series of abutments for said shifter, a lock for said shifter, and actuating means for said lock having operative connection with one of said abutments for said drive-clutch.

In testimony whereof, I have signed my name hereto in the presence of two subscribing witnesses.

OSCAR SCHNITZLER.

Witnesses:
Thos. F. McGuire,
Theresa Silber.